US012570821B2

(12) United States Patent
Zhao et al.

(10) Patent No.: US 12,570,821 B2
(45) Date of Patent: Mar. 10, 2026

(54) DIELECTRIC MATERIAL AND MANUFACTURING METHOD THEREOF

(71) Applicant: EAST CHINA UNIVERSITY OF SCIENCE AND TECHNOLOGY, Shanghai (CN)

(72) Inventors: Ling Zhao, Shanghai (CN); Yichong Chen, Shanghai (CN); Tao Liu, Shanghai (CN); Shun Yao, Shanghai (CN); Yijie Ling, Shanghai (CN); Zhimei Xu, Shanghai (CN); Dongdong Hu, Shanghai (CN)

(73) Assignee: EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 247 days.

(21) Appl. No.: 18/042,380

(22) PCT Filed: Mar. 23, 2022

(86) PCT No.: PCT/CN2022/082542
§ 371 (c)(1),
(2) Date: Feb. 21, 2023

(87) PCT Pub. No.: WO2022/227953
PCT Pub. Date: Nov. 3, 2022

(65) Prior Publication Data
US 2023/0374242 A1 Nov. 23, 2023

(30) Foreign Application Priority Data

Apr. 29, 2021 (CN) .......................... 202110474752.1

(51) Int. Cl.
*B29C 44/08* (2006.01)
*C08J 9/12* (2006.01)

(52) U.S. Cl.
CPC ............... *C08J 9/122* (2013.01); *B29C 44/08* (2013.01); *C08J 2201/02* (2013.01); *C08J 2203/06* (2013.01); *C08J 2323/16* (2013.01); *C08J 2323/20* (2013.01)

(58) Field of Classification Search
CPC ............................ B29C 44/08; C08J 2201/03
See application file for complete search history.

(56) References Cited

FOREIGN PATENT DOCUMENTS

| CN | 112851999 A | * | 5/2021 | .............. C08J 9/122 |
| EP | 0860262 B1 | * | 10/2001 | ......... B29C 44/3461 |
| TW | 1675865 B | * | 11/2019 | |

OTHER PUBLICATIONS

Machine translation of TW-1675865-B obtained from the European Patent Office website in Aug. 2025 (Year: 2025).*

* cited by examiner

*Primary Examiner* — Melissa A Rioja

(57) ABSTRACT

Provided are a dielectric material and a method for manufacturing the same. The dielectric material includes: subjecting a foamed sphere obtained by a primary foaming to a second foaming in a second moulding chamber filled with $CO_2$ at a second temperature in the range of 20° C. below $T_m$ to 5° C. below $T_m$ and under a second pressure of 15-20 MPa for 30-3600 min to obtain the dielectric material, wherein the primary foaming comprises specific steps of: foaming a foaming material sphere with a diameter of 20-800 mm in a first moulding chamber filled with $CO_2$ at a first temperature in the range of 80° C. below $T_m$ to 20° C. below $T_m$ and under a first pressure of 15-20 MPa to obtain the foamed sphere. Further provided is a dielectric material manufactured by the method above.

20 Claims, 1 Drawing Sheet

DIELECTRIC MATERIAL AND MANUFACTURING METHOD THEREOF

CROSS REFERENCE TO RELATED APPLICATION

This application claims the benefit and priority of Chinese Patent Application No. 2021104747521, entitled "dielectric material and manufacturing method thereof" filed on Apr. 29, 2021, the disclosure of which is incorporated by reference herein in its entirety as part of the present application.

TECHNICAL FIELD

The present disclosure relates to the technical field of dielectric materials, in particular to a dielectric material and a manufacturing method thereof.

BACKGROUND ART

In 1944, Rudolf Karl Lüneburg, an American mathematician, put forward the model of Lüneburg lens. An important basis of this model is that the dielectric constant of a sphere from inside to outside changes gradually conforming to a specific rule. Due to high production cost and immature industrialization technology, an antenna based on Lüneburg lens has not been widely used at present.

Various methods for manufacturing Lüneburg lens have been disclosed in Chinese patent application No. CN201911238076.7, entitled "method for manufacturing Lüneburg lens without adhesive"; Chinese patent application No. CN201910225149.2, entitled "method for manufacturing Lüneburg lens"; Chinese patent application No. CN201811615162.0, entitled "all-medium multi-beam scanning Lüneburg lens structure suitable for 3D printing and printing method"; Chinese patent application No. CN201910686927.8, entitled "method for manufacturing Lüneburg lens"; and Chinese patent application No. CN202010327192.2, entitled "spherical dielectric material and production method thereof and Lüneburg len". These methods include:

- (1) one-time foaming is conducted after being wrapped in multiple layers, so that a dielectric constant changes in gradient, which has a disadvantage that the number of wrapped layers is small, and the gradual change of dielectric constant is not obvious, and thus cannot meet certain requirements;
- (2) two hemispherical lens are prepared by 3D printing and then spliced, which has disadvantages of high cost of 3D printing, a week industrialization ability, and a long preparation time;
- (3) spherical Lüneburg len is prepared by bonding multi-layer granular materials using adhesive; in this method, a large number of adhesives is used, which pollutes the environment, can not ensure the consistency of bonding thickness, has great influence on performance, and has cumbersome operation;
- (4) multi-layer hemispheres are made of granular materials, and then spliced into a sphere; in this method, although no adhesive is used, this technology can not guarantee the stability of splicing, and the particle distribution at the splicing place is relatively uneven, which adversely affects performance.

Therefore, it is necessary to innovate the current manufacturing method, and realize the gradual change of dielectric constant by a simple method, without layered wrapping and adhesive, and the production process is fast, simple and low in cost.

SUMMARY

The technical problem to be solved by the present disclosure is to manufacture a dielectric material which is integrally formed and has gradual change of dielectric constant. The present disclosure provides a method for manufacturing a dielectric material, which makes it possible to manufacture a dielectric material which is integrally formed and has gradual change of dielectric constant.

In order to solve the above technical problem, the present disclosure provides the following technical solutions:

The present disclosure provides a method for manufacturing a dielectric material, comprising:

- subjecting a foamed sphere obtained by a primary foaming to a second foaming in a second moulding chamber filled with $CO_2$ at a second temperature of 20° C. below $T_m$ (that is $T_m$-20° C.) to 5° C. below $T_m$ (that is $T_m$-5° C.) and under a second pressure of 15-20 MPa for 30-3600 min to obtain the dielectric material,
- wherein the primary foaming comprises foaming a foaming material sphere with a diameter of 20-800 mm in a first moulding chamber filled with $CO_2$ at a first temperature of 80° C. below $T_m$ to 20° C. below $T_m$ and under a first pressure of 15-20 MPa to obtain the foamed sphere,
- wherein a foaming time of the primary foaming meets the following formula:

$$t \geq a \times (d/2)^{1.75};$$

in which,
t is the foaming time of the primary foaming, expressed in hour(s);
$a=0.07762$ h/mm$^{1.75}$; and
D is the diameter of the foaming material sphere, expressed in mm.

Wherein, the diameter of the foaming material sphere may be 20-800 mm, for example 20-200 mm, 20-150 mm, 20-100 mm and 20-50 mm.

Wherein, $T_m$ refers to the melting point of the foaming material under normal pressure, expressed in ° C.

Wherein, the first temperature is in the range of 80° C. below $T_m$ to 20° C. below $T_m$. In some embodiments, the first temperature is in the range of 50° C. below $T_m$ to 30° C. below $T_m$. The effect of setting a foaming temperature is to saturate the foaming material, such as a polypropylene material, at a low temperature, so that a small gas core is formed inside the foaming material first. When the second foaming is conducted, a gas is completely used for the growth of a gas pore, and does not involve forming gas core. If the foaming temperature is too high, the gas pore is too large, and the gradual change of dielectric constant cannot be accurately controlled. If the foaming temperature is too low, the saturation time of polypropylene material is too long, which adversely affects the production efficiency. The dielectric constant can characterize the dielectric properties of the dielectric material, and the higher the dielectric constant is, the greater the refractive index of an electromagnetic wave is.

Wherein, the first pressure may be in the range of 15-20 MPa, preferably 15-18 MPa.

Wherein, the foaming time of the primary foaming may be 260-15000 min, for example, 265-14730 min and 4400-14730 min.

Wherein, the foaming material sphere can be obtained by injection molding. The foaming material sphere may be a solid sphere. A foaming material of the foaming material sphere may be polyolefin or polyester, such as polyethylene, polypropylene, polybutene or polyethylene terephthalate. Polypropylene may be one or more selected from the group consisting of polypropylene homopolymer, an ethylene-propylene copolymer, and an ethylene-propylene-butene copolymer. In the ethylene-propylene copolymer and the ethylene-propylene-butene copolymer, a propylene monomer is in an amount of exceeding 90%, so the above-mentioned substances may be collectively referred to as polypropylene materials. In some embodiments, the foaming material is an ethylene-propylene copolymer or an ethylene-propylene-butene copolymer.

Wherein, the first moulding chamber for the primary foaming and the second moulding chamber for the second foaming may be common moulding chambers for foaming in the art, such as a spherical moulding chamber. The first moulding chamber and the second moulding chamber may be the same or different.

Wherein, the primary foaming may further comprise, after foaming, depressurizing the first moulding chamber; a rate for depressurizing may be a common rate in the art, preferably at least 100 MPa/s.

Wherein, the primary foaming may further comprise, after depressurizing, allowing the foamed sphere stand for at least 24 hours so as to release $CO_2$ from the foaming material.

Wherein, the second temperature may be in the range of 5° C. below $T_m$ to 20° C. below $T_m$, preferably 10° C. below $T_m$ to 15° C. below $T_m$. Setting the second temperature from 10° C. below $T_m$ to 15° C. below $T_m$ can make the polypropylene material undergo a second saturation at an appropriate temperature, so that its expansion ratio can reach up to 30, that is, the outermost material has a density of 30 kg/m$^3$. The foaming temperature may be slightly different depending on polypropylene with different structures.

Wherein, the foaming time for the second foaming may be 30-3600 min, preferably 60-3000 min. This foaming time is related to the diameter of the foamed sphere, and the larger the diameter of the foamed sphere is, the longer the foaming time is. If the foaming time is too short, $CO_2$ can not penetrate into the foamed sphere, which results in that the foaming effect cannot be achieved. If the foaming time is too long, $CO_2$ can penetrate into the foamed sphere completely and reach the dissolution equilibrium. After foaming, the internal density of the sphere is consistent, which can not meet the requirement of gradual change of density.

Wherein, the second pressure may be in the range of 15-20 MPa, preferably 15-18 MPa.

Wherein, the method for manufacturing a dielectric material further comprises, depressurizing the second moulding chamber after the second foaming; a rate for depressurizing may be a common rate in the art, preferably at least 100 MPa/s.

In some embodiments, the diameter of the foaming material sphere is 20-200 mm, the first temperature is in the range of 50° C. below $T_m$ to 30° C. below $T_m$, the first pressure is in the range of 15-18 MPa, the foaming time for the primary foaming is 262-14730 min, the second temperature is in the range of 15° C. below $T_m$ to 10° C. below $T_m$, and the foaming time for the second foaming is 30-3600 min. The dielectric materials prepared under the above conditions can be used as Luneburg lens.

In some embodiments, the diameter of the foaming material sphere is 90-110 mm, the first temperature is in the range of 50° C. below $T_m$ to 40° C. below $T_m$, the first pressure is in the range of 15-16 MPa, the foaming time for the primary foaming is 4300-4500 min, the second temperature is in the range of 12° C. below $T_m$ to 10° C. below $T_m$, the second pressure is in the range of 15-16 MPa, and the foaming time for the second foaming is 1100-1300 min. In some embodiments, the diameter of the foaming material sphere is 100 mm, the first temperature is 45° C. below $T_m$, the first pressure is 15 MPa, the foaming time for the primary foaming is 4400 min, the second temperature is 10° C. below $T_m$, the second pressure is 15 MPa, and the foaming time for the second foaming is 1200 min.

In some embodiments, the diameter of the foaming material sphere is 200 mm, the first temperature is in the range of 50° C. below $T_m$ to 40° C. below $T_m$, the first pressure is in the range of 15-16 MPa, the foaming time for the primary foaming is 14700-14730 min, the second temperature is in the range of 12° C. below $T_m$ to 10° C. below $T_m$, the second pressure is in the range of 15-16 MPa, and the foaming time for the second foaming is 3000-4000 min. In some embodiments, the diameter of the foaming material sphere is 200 mm, the first temperature is 40° C. below $T_m$, the first pressure is 15 MPa, the foaming time for the primary foaming is 14730 min, the second temperature is 10° C. below $T_m$, the second pressure is 15 MPa, and the foaming time for the second foaming is 3600 min.

The present disclosure further provides a dielectric material, which is manufactured by the method for manufacturing a dielectric material as described above and comprises a dielectric material body in a shape of sphere. Wherein, a density of the dielectric material body may change from large to small in the direction from inside to outside.

In some embodiments, a diameter of the dielectric material body is in the range of 30 mm to 1000 mm, and is adjustable according to different requirements of antennas.

In some embodiments, an outer side of the dielectric material body is provided with a protective layer. In some embodiments, the protective layer is selected from the group consisting of a polypropylene coated film, a polyethylene coated film, and a polyethylene terephthalate coated film.

In some embodiments, a dielectric constant of the dielectric material body in a radial direction gradually changes from 2.08 to 1.04, and a change rule is in accordance with the following formula:

$$\varepsilon_r = 2 - \left(\frac{r}{R}\right)^2,$$

wherein r is a distance from a point in the radial direction of the dielectric material body to the center of the dielectric material body, $\varepsilon_r$ is the dielectric constant at a point in the radial direction of the dielectric material body, and R is a radius of the dielectric material body. A sphere conforming to the change rule above can be used as a Luneburg len. It is a spherical len, has a gradually changing internal dielectric constant, and can converge incident electromagnetic waves with specific wavelengths to a certain point on the spherical surface. Similarly, it can also reflect electromagnetic waves back in the original direction.

In some embodiments, the gradual change in the dielectric constant of the sphere is achieved by a gradual change in the density, for example, the dielectric constant is 2.08 when the material density is 810 kg/m$^3$, and the dielectric constant is 1.04 when the material density is 30 kg/m$^3$.

On the basis that the common sense in the art is not violated, the above-mentioned conditions can be arbitrarily combined to obtain the various preferred embodiments in the present disclosure.

The reagents and raw materials used in the present disclosure may be commercially available.

The present disclosure has the following prominent effects:

1. In the present disclosure, the foamed sphere with uniform gas core is subjected to a second foaming. The distribution of gas pores in the sphere is effectively controlled by controlling the foaming time so as to obtain a foamed sphere with gradually changing density inside the sphere, and further to obtain a foamed sphere with gradually changing dielectric constant. On the basis of this, by further adjusting the foaming time, it is possible to obtain a foamed sphere with changing dielectric constant complying with specific change rule, which can be used as Luneburg lens.

2. The process is simplified and the production efficiency is improved by the one-step forming foaming process according to the present disclosure.

DETAILED DESCRIPTION OF THE EMBODIMENTS

Figure 1:
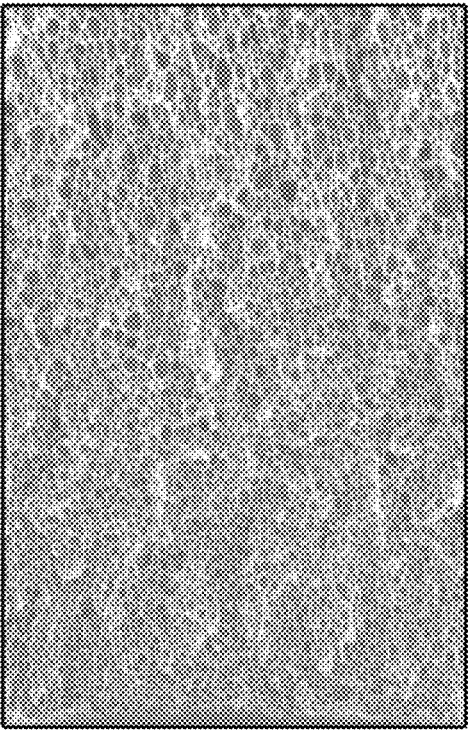
FIG. 1 shows a scanning electron microscope image of product according to Example 1.

The present disclosure is further described by exemplary embodiments below, but is not thus limited to the scope of the embodiments. The experimental methods that not specifies the specific conditions in the following examples are selected according to the conventional methods and conditions, or according to the commodity instructions.

In the following examples and comparative examples, the solid spheres of polypropylene homopolymer were obtained by conventional injection molding of commercially available polypropylene particles using an injection molding machine.

In the present disclosure, the melting point is measured by a differential scanning calorimeter (NETZSCHDSC 204HP, Germany). The testing steps are as follow: the temperature is raised from 25° C. to 200° C. at a heating rate of 10° C./min, and held at the raised temperature for 5 min. The temperature is then declined to 50° C. at a cooling rate of 10° C./min, and held at the declined temperature for 5 min. Finally, the temperature is raised again to 200° C. at a heating rate of 10° C./min. The peak value in the second heating curve corresponds to the melting point.

In the present disclosure, the density of the foamed sample is measured by a drainage method, and the foaming ratio is calculated by the following formula:

$$R_V = \rho_0 / \rho_f \quad (2\text{-}6)$$

wherein, $\rho_0$ and $\rho_f$ are the sample density before and after foaming, respectively.

In the following examples and comparative examples, the dielectric constant of the dielectric materials was obtained by conversion from density, and the conversion formula is as follows:

$$\varepsilon_r = \frac{\varepsilon_{pp}}{\rho_{pp}/\rho_{foam}} + \frac{\varepsilon_{air}(\rho_{pp}/\rho_{foam} - 1)}{\rho_{pp}/\rho_{foam}}$$

wherein $\varepsilon_r$ is a dielectric constant at a point in the radial direction of the dielectric material body; $\varepsilon_{pp}$ is a dielectric constant of the propylene homopolymer solid sphere, with a value of 2.2; $\rho_{pp}$ is a density of the propylene homopolymer solid sphere, with a value of 900 kg/m$^3$; $\varepsilon_{air}$ is a dielectric constant of air, with a value of 1; $\rho_{foam}$ is a density at a point in the radial direction of the dielectric material body. The density at a point in the radial direction of the dielectric material body can be measured using a conventional drainage method in the art, which may include: cutting the dielectric material body along a first spherical surface and a second spherical surface to obtain a tested part containing the point, and measuring the density of the tested part by a drainage method (that is, the density at the point in the radius direction of the dielectric material body), wherein the first spherical surface and the second spherical surface are complete spherical surface; the spherical centers of the first spherical surface and the second spherical surface coincide with the spherical center of the dielectric material body; the thickness of the tested part (that is, the difference between the radials of the first spherical surface and the second spherical surface) is 1 mm; and the point is located at the center in the thickness direction of the tested part.

Unless otherwise specified, the dielectric constant in the present disclosure refers to the relative dielectric constant.

Example 1

A polypropylene homopolymer solid sphere (having a $T_m$ of 155° C.) with a diameter of 100 mm was placed into a spherical moulding chamber (with a diameter of 300 mm). The moulding chamber was heated to a first foaming temperature of 110° C. by programmed temperature control at a heating rate of 10° C./mm. The moulding chamber was kept at the first foaming temperature. CO$_2$ was injected thereto until a pressure of injected CO$_2$ reached 15 MPa. A foaming was conducted for 4400 min at this pressure. The moulding chamber was rapidly depressurized at a rate of 400 MPa/s. The foamed sphere after a primary foaming was took out from the moulding chamber and left to stand for 24 hours. Then, the foamed sphere (with a diameter of 104 mm) was placed into the spherical moulding chamber again. The moulding chamber was heated to a second foaming temperature of 145° C. by programmed temperature control at a heating rate of 10° C./mm. The moulding chamber was kept at the second foaming temperature. CO$_2$ was injected thereto until a pressure of injected CO$_2$ reached 15 MPa. A second foaming was conducted for 1200 min at this pressure. The moulding chamber was rapidly depressurized at a rate of 400 MPa/s to obtain a dielectric material with gradually changing dielectric constant. The dielectric material comprises a spherical dielectric material body, wherein the density of the dielectric material body changes from large to small in the direction from inside to outside. The scanning electron microscope image of the cross section of the spherical dielectric material passing through the spherical center is shown in FIG. 1, in which the lower a position in the image is, the closer it is to the spherical center. From FIG. 1, it can be seen that there are gas pores distributed in the spherical dielectric material, and the closer they are to the spherical center, the smaller the size of the gas pores is. At the position of the spherical center, the spherical dielectric material is solid.

Example 2

A polypropylene homopolymer solid sphere (having a $T_m$ of 155° C.) with a diameter of 200 mm was placed into a spherical moulding chamber (with a diameter of 300 mm). The moulding chamber was heated to a first foaming temperature of 115° C. by programmed temperature control at a heating rate of 10° C./mm. The moulding chamber was kept at the first foaming temperature. $CO_2$ was injected thereto until a pressure of injected $CO_2$ reached 15 MPa. A foaming was conducted for 14730 min at this pressure. The moulding chamber was rapidly depressurized at a rate of 400 MPa/s. The foamed sphere after a primary foaming was took out from the moulding chamber and left to stand for 24 hours. Then, the foamed sphere (with a diameter of 210 mm) was placed into the spherical moulding chamber again. The moulding chamber was heated to a second foaming temperature of 145° C. by programmed temperature control at a heating rate of 10° C./mm. The moulding chamber was kept at the second foaming temperature. $CO_2$ was injected thereto until a pressure of injected $CO_2$ reached 15 MPa. A second foaming was conducted for 3600 min at this pressure. The moulding chamber was rapidly depressurized at a rate of 400 MPa/s to obtain a dielectric material with gradually changing dielectric constant. The dielectric material comprises a spherical dielectric material body, wherein the density of the dielectric material body changes from large to small in the direction from inside to outside.

Example 3

A polypropylene homopolymer solid sphere (having a $T_m$ of 155° C.) with a diameter of 100 mm was placed into a spherical moulding chamber. The moulding chamber was heated to a first foaming temperature of 130° C. by programmed temperature control at a heating rate of 10°

C./mm. The moulding chamber was kept at the second foaming temperature. $CO_2$ was injected thereto until a pressure of injected $CO_2$ reached 15 MPa. A second foaming was conducted for 1200 min at this pressure. The moulding chamber was rapidly depressurized at a rate of 400 MPa/s to obtain a dielectric material with gradually changing dielectric constant. The dielectric material comprises a spherical dielectric material body, wherein the density of the dielectric material body changes from large to small in the direction from inside to outside.

Example 4

A polypropylene homopolymer solid sphere (having a $T_m$ of 155° C.) with a diameter of 100 mm was placed into a spherical moulding chamber. The moulding chamber was heated to a first foaming temperature of 110° C. by programmed temperature control at a heating rate of 10° C./mm. The moulding chamber was kept at the first foaming temperature. $CO_2$ was injected thereto until a pressure of injected $CO_2$ reached 15 MPa. A foaming was conducted for 4400 min at this pressure. The moulding chamber was rapidly depressurized at a rate of 400 MPa/s. The foamed sphere after a primary foaming was took out from the moulding chamber and left to stand for 24 hours. Then, the foamed sphere (with a diameter of 104 mm) was placed into the spherical moulding chamber again. The moulding chamber was heated to a second foaming temperature of 145° C. by programmed temperature control at a heating rate of 10° C./mm. The moulding chamber was kept at the second foaming temperature. $CO_2$ was injected thereto until a pressure of injected $CO_2$ reached 15 MPa. A second foaming was conducted for 1200 min at this pressure. The moulding chamber was rapidly depressurized at a rate of 400 MPa/s to obtain a dielectric material with gradually changing dielectric constant. The dielectric material comprises a spherical dielectric material body, wherein the density of the dielectric material body changes from large to small in the direction from inside to outside.

Examples 5-8

These examples were conducted similar to example 1 except that the parameters in the following table are different:

| | The diameter of a foaming material sphere | The first temperate | The first pressure | Foaming time for the primary foaming | The second temperate | The second pressure | Foaming time for the second foaming |
|---|---|---|---|---|---|---|---|
| Example 5 | 20 mm | 110° C. | 18 MPa | 265 min | 145° C. | 15 MPa | 150 min |
| Example 6 | 50 mm | 110° C. | 18 MPa | 1310 min | 145° C. | 15 MPa | 400 min |
| Example 7 | 80 mm | 110° C. | 18 MPa | 3000 min | 145° C. | 15 MPa | 800 min |
| Example 8 | 150 mm | 110° C. | 18 MPa | 8910 min | 145° C. | 15 MPa | 2600 min |

C./mm. The moulding chamber was kept at the first foaming temperature. $CO_2$ was injected thereto until a pressure of injected $CO_2$ reached 15 MPa. A foaming was conducted for 4400 min at this pressure. The moulding chamber was rapidly depressurized at a rate of 400 MPa/s. The foamed sphere after a primary foaming was took out from the moulding chamber and left to stand for 24 hours. Then, the foamed sphere (with a diameter of 110 mm) was placed into the spherical moulding chamber again. The moulding chamber was heated to a second foaming temperature of 145° C. by programmed temperature control at a heating rate of 10°

Dielectric materials with gradually changing dielectric constant were obtained according to examples 5-8. The dielectric material comprises a spherical dielectric material body, wherein the density of the dielectric material body changes from large to small in the direction from inside to outside

Comparative Example 1

A polypropylene homopolymer solid sphere (having a $T_m$ of 155° C.) with a diameter of 100 mm was placed into a spherical moulding chamber. The moulding chamber was heated to a first foaming temperature of 110° C. by programmed temperature control at a heating rate of 10° C./mm. The moulding chamber was kept at the first foaming temperature. $CO_2$ was injected thereto until a pressure of injected $CO_2$ reached 15 MPa. The moulding chamber was kept at this pressure for 300 min. The moulding chamber was rapidly depressurized at a rate of 400 MPa/s. The foamed sphere after a primary foaming was took out from the moulding chamber and left to stand for 24 hours. And then the foamed sphere (with a diameter of 104 mm) was placed into the spherical moulding chamber again. The moulding chamber was heated to a second foaming temperature of 145° C. by programmed temperature control at a heating rate of 10° C./mm. The moulding chamber was kept at the second foaming temperature. $CO_2$ was injected thereto until a pressure of injected $CO_2$ reached 15 MPa. The moulding chamber was kept for 50 min at this pressure. The moulding chamber was rapidly depressurized at a rate of 400 MPa/s to obtain a spherical dielectric material of which the dielectric constant does not change gradually.

Comparative Example 2

A polypropylene homopolymer solid sphere (having a $T_m$ of 155° C.) with a diameter of 100 mm was placed into a spherical moulding chamber. The moulding chamber was heated to a first foaming temperature of 110° C. by programmed temperature control at a heating rate of 10° C./mm. The moulding chamber was kept at the first foaming temperature. $CO_2$ was injected thereto until a pressure of injected $CO_2$ reached 15 MPa. The moulding chamber was kept at this pressure for 300 min. The moulding chamber was rapidly depressurized at a rate of 400 MPa/s. The foamed sphere after a primary foaming was took out from the moulding chamber and left to stand for 24 hours. Then, the foamed sphere (with a diameter of 104 mm) was placed into the spherical moulding chamber again. The moulding chamber was heated to a second foaming temperature of 145° C. by programmed temperature control at a heating rate of 10° C./mm. The moulding chamber was kept at the second foaming temperature. $CO_2$ was injected thereto until a pressure of injected $CO_2$ reached 15 MPa. The moulding chamber was kept for 150 min at this pressure. The moulding chamber was rapidly depressurized at a rate of 400 MPa/s to obtain a spherical dielectric material of which the dielectric constant does not change gradually.

Comparative Example 3

A polypropylene homopolymer solid sphere (having a $T_m$ of 155° C.) with a diameter of 100 mm was placed into a spherical moulding chamber. The moulding chamber was heated to a foaming temperature of 145° C. by programmed temperature control at a heating rate of 10° C./mm. The moulding chamber was kept at the foaming temperature. $CO_2$ was injected thereto until a pressure of injected $CO_2$ reached 15 MPa. The moulding chamber was kept at this pressure for 100 min. Then, The moulding chamber was rapidly depressurized at a rate of 400 MPa/s to obtain a spherical dielectric material of which the dielectric constant does not change gradually.

Effect Example

Figure 2:
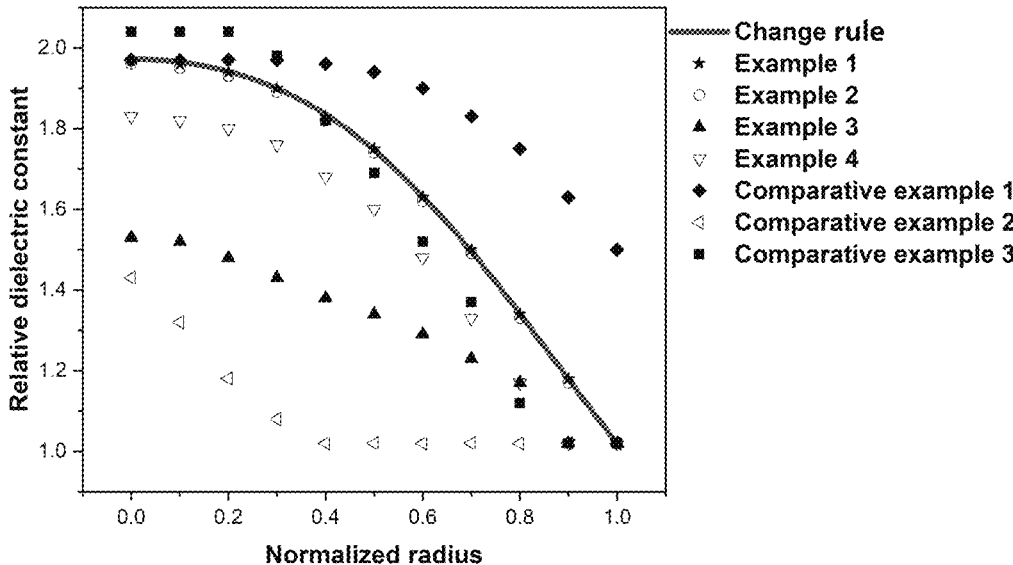
FIG. 2 is a diagram showing the dielectric constant as a function of radius according to examples and comparative examples.

The dielectric constant of the Luneburg lens manufactured by the methods according to Examples 1 and 2 can vary with the rule, as shown in FIG. 2. The first foaming temperature in Example 3 is too high, so that the gas pore size of the sphere obtained by the first foaming is too large, which results in that the gas pore grows too largely during the second foaming, and therefore the relative dielectric constant is low. In example 4, the standing time is too short, resulting in that $CO_2$ can not completely escape from the sphere, which causes excessive $CO_2$ permeation in the sphere during the second saturation, and low relative dielectric constant. In comparative example 1, the second saturation time is too short, which leads to too little $CO_2$ permeation and high relative dielectric constant. In comparative example 2, the second saturation time is too long, which leads to too much $CO_2$ permeation and low relative dielectric constant. In Comparative example 3, a first foaming is not performed, and therefore foaming does not exist at the core of the sphere, while complete foaming exists at the surface of the sphere, and thus the relative dielectric constant is higher near the core of the sphere and lower near the surface.

While specific embodiments have been described above in the present disclosure, it should be understood for those skilled in the art that the embodiments are exemplary illustration only and that various changes or modifications may be made to the embodiments without departing from the principles and essence of the present disclosure. Therefore, the scope of protection in the present disclosure is defined by the appended claims.

What is claimed is:

1. A method for manufacturing a dielectric material, comprising, subjecting a foamed sphere obtained by a primary foaming to a second foaming in a second molding chamber filled with $CO_2$ at a second temperature of 20° C. below $T_m$ to 5° C. below the $T_m$ and under a second pressure of 15-20 MPa for 30-3600 min to obtain the dielectric material, wherein the primary foaming comprises steps of:

foaming a foaming material sphere with a diameter of 20-800 mm in a first molding chamber filled with $CO_2$ at a first temperature of 80° C. below the $T_m$ to 20° C. below the $T_m$ and under a first pressure of 15-20 MPa to obtain the foamed sphere, and the $T_m$ refers to a melting point of a foaming material of the foaming material sphere under normal pressure, and wherein a foaming time for the primary foaming meets the following formula:

$$t \geq a \times (d/2)^{1.75};$$

in which, t is the foaming time for the primary foaming, expressed in hour(s);

a=0.07762 hours/mm$^{1.75}$; and d is the diameter of the foaming material sphere, expressed in mm.

2. The method of claim 1, wherein the first temperature is in a range of 50° C. below the $T_m$ to 30° C. below the $T_m$; and/or the first pressure is in a range of 15-18 MPa; and/or the first molding chamber used in the primary molding and the second molding chamber used in the second foaming are in a shape of a sphere; and/or the second temperature is in a range of 10° C. below the $T_m$ to 15° C. below the $T_m$; and/or a foaming time for the second foaming is 60-3000 min; and/or the second pressure is in a range of 15-18 MPa.

3. The method of claim 1, wherein the primary foaming further comprises, after foaming, depressurizing the first molding chamber at a rate of at least 100 MPa/s; and after depressurizing, leaving the foamed sphere to stand for at least 24 hours.

4. The method of claim 1, wherein the method further comprises depressurizing the second molding chamber after the second foaming at a rate of at least 100 MPa/s.

5. The method of claim 1, wherein the foaming material sphere is a solid sphere; and/or the foaming material sphere is obtained by injection molding; and/or the foaming material of the foaming material sphere is polyolefin or polyester; and/or the diameter of the foaming material sphere is 20-200 mm.

6. The method of claim 1, wherein the foaming material of the foaming material sphere is selected from the group consisting of polyethylene, polypropylene, polybutene, and polyethylene terephthalate.

7. The method of claim 1, wherein the diameter of the foaming material sphere is 20-200 mm, the first temperature is in a range of $50°$ C. below the $T_m$ to $30°$ C. below the $T_m$, the first pressure is in a range of 15-18 MPa, the foaming time for the primary foaming is 262-14730 min, the second temperature is in a range of $15°$ C. below the $T_m$ to $10°$ C. below the $T_m$, and the second pressure is in a range of 15-18 MPa.

8. A dielectric material obtained by the method of claim 1, comprising a dielectric material body in a shape of a sphere.

9. The dielectric material of claim 8, wherein the dielectric material body has a diameter of 30 mm to 1000 mm; and/or an outer side of the dielectric material body is provided with a protective layer selected from the group consisting of a polypropylene coated film, a polyethylene coated film, and a polyethylene terephthalate coated film; and/or a dielectric constant of the dielectric material body in a radial direction gradually changes from 2.08 to 1.04, and a change rule for the dielectric constant of the dielectric material body is in accordance with the following formula:

$$\varepsilon_r = 2 - \left(\frac{r}{R}\right)^2,$$

wherein r is a distance from a point in the radial direction of the dielectric material body to a center of the dielectric material body, $\varepsilon_r$ is the dielectric constant at a point in the radial direction of the dielectric material body, and R is a radius of the dielectric material body.

10. The method of claim 2, wherein the primary foaming further comprises, after foaming, depressurizing the first molding chamber at a rate of at least 100 MPa/s; and after depressurizing, leaving the foamed sphere to stand for at least 24 hours.

11. The method of claim 2, wherein the method further comprises depressurizing the second molding chamber after the second foaming at a rate of at least 100 MPa/s.

12. The method of claim 3, wherein the method further comprises depressurizing the second molding chamber after the second foaming at a rate of at least 100 MPa/s.

13. The method of claim 2, wherein the foaming material sphere is a solid sphere; and/or the foaming material sphere is obtained by injection molding; and/or the foaming material of the foaming material sphere is polyolefin or polyester; and/or the diameter of the foaming material sphere is 20-200 mm.

14. The method of claim 3, wherein the foaming material sphere is a solid sphere; and/or the foaming material sphere is obtained by injection molding; and/or the foaming material of the foaming material sphere is polyolefin or polyester; and/or the diameter of the foaming material sphere is 20-200 mm.

15. The method of claim 4, wherein the foaming material sphere is a solid sphere; and/or the foaming material sphere is obtained by injection molding; and/or the foaming material of the foaming material sphere is polyolefin or polyester; and/or the diameter of the foaming material sphere is 20-200 mm.

16. The method of claim 2, wherein the foaming material of the foaming material sphere is selected from the group consisting of polyethylene, polypropylene, polybutene, and polyethylene terephthalate.

17. The method of claim 2, wherein the diameter of the foaming material sphere is 20-200 mm, the first temperature is in the range of $50°$ C. below the $T_m$ to $30°$ C. below the $T_m$, the first pressure is in the range of 15-18 MPa, the foaming time for the primary foaming is 262-14730 min, the second temperature is in the range of $15°$ C. below the $T_m$ to $10°$ C. below the $T_m$, and the second pressure is in the range of 15-18 MPa.

18. The method of claim 3, wherein the diameter of the foaming material sphere is 20-200 mm, the first temperature is in a range of $50°$ C. below the $T_m$ to $30°$ C. below the $T_m$, the first pressure is in a range of 15-18 MPa, the foaming time for the primary foaming is 262-14730 min, the second temperature is in a range of $15°$ C. below the $T_m$ to $10°$ C. below the $T_m$, and the second pressure is in a range of 15-18 MPa.

19. The method of claim 1, wherein the foaming material of the foaming material sphere is at least one selected from the group consisting of polypropylene homopolymer, ethylene-propylene copolymer, and ethylene-propylene-butene copolymer.

20. The method of claim 1, wherein the diameter of the foaming material sphere is 90-110 mm, the first temperature is in a range of $50°$ C. below the $T_m$ to $40°$ C. below the $T_m$, the first pressure is in a range of 15-16 MPa, the foaming time for the primary foaming is 4300-4500 min, the second temperature is in a range of $12°$ C. below the $T_m$ to $10°$ C. below the $T_m$, the second pressure is in a range of 15-16 MPa, and a foaming time for the second foaming is 1100-1300 min.

* * * * *